United States Patent [19]
Johansen et al.

[11] Patent Number: 5,569,352
[45] Date of Patent: Oct. 29, 1996

[54] MACHINE FOR SEAM WELDING LAPS OF WELDABLE LENGTHS OF COVERING

[75] Inventors: Tore Johansen, Oslo; Hakon Svindal, Gan, both of Norway

[73] Assignee: A/S Fjeldhammer Brug, Fjellhamar, Norway

[21] Appl. No.: 355,684

[22] Filed: Dec. 14, 1994

[30] Foreign Application Priority Data

Dec. 14, 1993 [NO] Norway ..................................... 934603

[51] Int. Cl.⁶ ..................................................... B32B 31/00
[52] U.S. Cl. ........................... 156/499; 156/574; 156/579
[58] Field of Search ................................ 156/380.9, 391, 156/499, 574, 579; 219/523, 533, 535

[56] References Cited

U.S. PATENT DOCUMENTS

| | | | |
|---|---|---|---|
| 1,924,523 | 8/1933 | Spring | 156/391 |
| 2,390,971 | 12/1945 | Vang | 219/10 |
| 4,504,352 | 3/1985 | Meyer | 156/499 |
| 4,725,328 | 2/1988 | Arnold | 156/380.9 |
| 4,737,213 | 4/1988 | Paeglis et al. | 156/499 X |
| 4,743,332 | 5/1988 | Black | 156/574 X |
| 4,744,855 | 5/1988 | Ellenberger et al. | 156/499 |
| 4,806,194 | 2/1989 | Wald | 156/499 X |
| 4,855,004 | 8/1989 | Chitjian | 156/574 X |
| 4,872,941 | 10/1989 | Lippman et al. | 156/499 X |
| 5,234,533 | 8/1993 | Neal | 156/499 X |

FOREIGN PATENT DOCUMENTS 921473  12/1954  Germany ..................... B23U 11/06

*Primary Examiner*—David A. Simmons
*Assistant Examiner*—Paul M. Rivard
*Attorney, Agent, or Firm*—Cushman Darby & Cushman, L.L.P.

[57] ABSTRACT

A machine for seam welding overlapping heat weldable lengths of covering, comprising a wheel-borne frame having a heating element suspended on one side designed for insertion between an underlying and an overlying length of covering. The machine has pressing means and driving wheels for compressive stress of the upper side of the overlying length of covering and for movement of the machine in the longitudinal direction of the overlapping seam or lap. To make possible wheel transport of the machine, with the heating element raised from the underlying surface, and to make possible an easier guiding of the heating element between the two lengths of covering in the lap, the machine has especially positioned transport wheels which in the welding position will be lifted clear of the underlying surface, but by tilting the machine can be brought into contact with the underlying surface, so that the machine can be wheeled by means of the transport wheels. The heating element is suspended such that its leading edge will have the initial contact with the underlying surface, whereby the guiding and insertion of the heating element between the lengths of covering are facilitated and any damage to the lengths of covering as a consequence of premature and/or undesired contact between a hot heating element and the underlying surface is avoided.

9 Claims, 7 Drawing Sheets

MACHINE FOR SEAM WELDING LAPS OF WELDABLE LENGTHS OF COVERING

The invention relates to a machine for seam welding laps of weldable lengths of covering comprising a wheel-borne frame having a heating element suspended on one side designed to be inserted between an underlying and an overlying length of covering, and having a pressing means and driving wheel for compressive stress of the upper side of the overlying length of covering in the seam area above the inserted heating element and for movement of the frame in the longitudinal direction of the overlapping seam.

The invention has been developed in connection with the methodology which is used today for the laying of a roof covering on an underlying surface, where the covering is unrolled in lengths on the underroof and is laid with a certain amount of reciprocal overlapping. The overlap or lap is heated so that the lap fuses.

A seam welding machine as mentioned by way of introduction functions extremely well and is highly conducive to reducing the costs incurred when laying roof covering. The transport of the machine on the underlying surface when conveying it to the lap that is to be welded, and on moving the machine from one welded lap seam to the next, parallel lap, presents problems. When the heating element is cold the machine can, of course, be moved or transported by using the existing driving wheels, but when moving the machine from one welded lap to the next, the machine cannot simply be wheeled on the driving wheels, because these are connected via the transmission to the motor and cannot therefore be wheeled faster than the driving motor allows. Moreover, the heating element will often be hot and could damage the underlying roof covering. The seam welding machine is therefore often lifted manually and carried to the point at which the next seam weld is to be started. This is heavy and load-intensive. The positioning of the machine with the heating element inserted between an overlying and underlying length of covering also presents problems.

Thus, there is a need for a machine that can be moved easily and can be positioned easily in an initial welding position.

According to the invention, a machine is therefore proposed as mentioned by way of introduction, characterized in that the frame has transport wheels positioned transverse to the welding direction and outside the heating element, said transport wheels being lifted clear of the underlying surface in the welding position.

When the machine is in use, i.e., when seam welding is taking place, the transport wheels will thus be lifted clear of the underlying surface, i.e., they will hang freely and not hamper the progress in the welding direction. When the machine is to be transported, the frame is tilted about a pivotal axis parallel to the welding direction, so that the transport wheels are brought down into contact with the underlying surface. The machine can then be pulled out laterally relative to the lap and transported as required with the aid of the transport wheels.

It would be of advantage to provide bearing/support wheels between the driving wheels of the frame and the transport wheels, having the same operational orientation as the transport wheels. These bearing/support wheels could to advantage be used as rolling support and as pivotal centers during the manipulation of the machine between the welding and transport positions. When the machine has been brought into the transport position the heating element, the pressing means and the driving wheel will be pivoted up from the underlying surface. It would be especially advantageous if the heating element could be limitedly pivotally suspended in the frame about an axis parallel to the operational direction of the driving wheels, and having a pivotal sector which comprises the operational plane of the driving wheels. This means that in the transport position, the heating element will hang in a position below the intended operational plane of the driving wheels. On pivoting the frame to the welding position, the heating element will be the first to have contact with the underlying surface. This means that the transport wheels and the bearing/support wheels can be used for moving the machine transverse to the lap, so that the heating element is eased in between the underlying and overlying length of covering in the lap. It is only then that the pressing means and the driving wheels are brought into contact with the overlying length of covering, by means of a continued pivotal movement of the frame downwards, with the bearing/support wheels as pivotal centers.

In this connection, it is especially advantageous if the heating element is capable of being pivotally suspended such that the free end thereof will touch the underlying surface first, as this will facilitate the insertion of the heating element between the lengths of covering.

It may also be advantageous to provide, about an axis parallel to the pivotal axis of the heating element, a limitedly pivotally mounted guiding member for the heating element. The pivotal movement will be such that a guiding member of this kind will have the initial contact with the gap between the underlying and overlying length of covering in the lap, and will raise the overlying length of covering, and will also come down again, thereby considerably facilitating the subsequent guiding and positioning of the heating element.

The heating element may to advantage be constructed in the form of two heating shoes that are limitedly pivotally mounted in a common carrier about a parallel axis transverse to the pivotal axis of the heating element. This gives a heating element with good adaptability to the underlying surface.

It would be expedient if the guiding member could be positioned between the two heating shoes.

The opening that is formed between the two heating shoes will be conducive to a better quality welding, because the adhesive, e.g., asphalt, can flow down to the under side of the heating element in this opening, thereby providing a more controlled distribution of the adhesive in the lap.

According to the invention, the driving wheels can expediently be constituent members in a driving belt/pressing assembly. It is particularly advantageous if the driving belt can form the pressing member in this assembly.

In an advantageous, practical embodiment the driving belt is formed by two parallel transmission chains. The driving belt or transmission chains are attached to a tension assembly for taking up slack and for making possible a desired compliance in the contact between the driving belt and the underlying surface.

The invention shall now be described in more detail with reference to the drawings, where:

Figure 1:
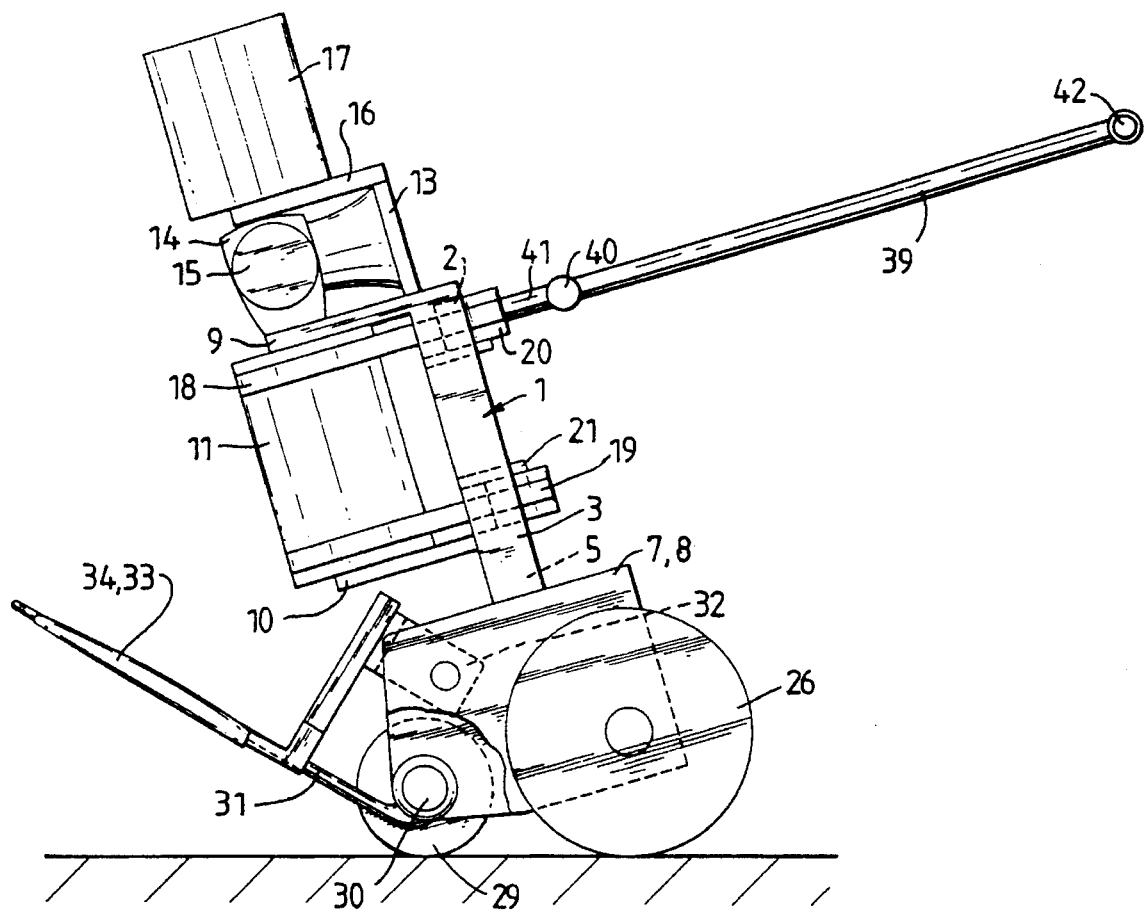
FIG. 1 is an outline of a machine according to the invention, in the transport position.
Figure 4:
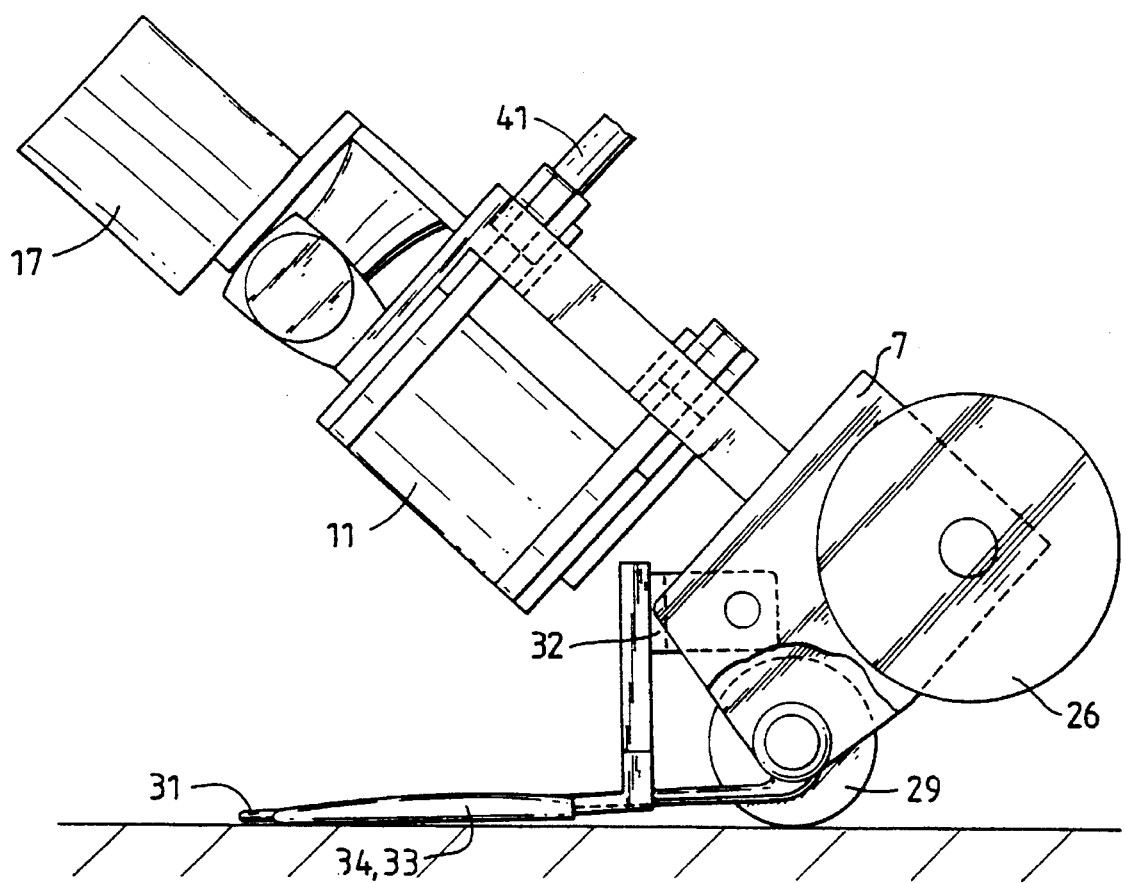
FIG. 4 shows the machine in an intermediate position, where the heating element has been brought into contact with the underlying surface, ready for insertion into a lap.
Figure 5:
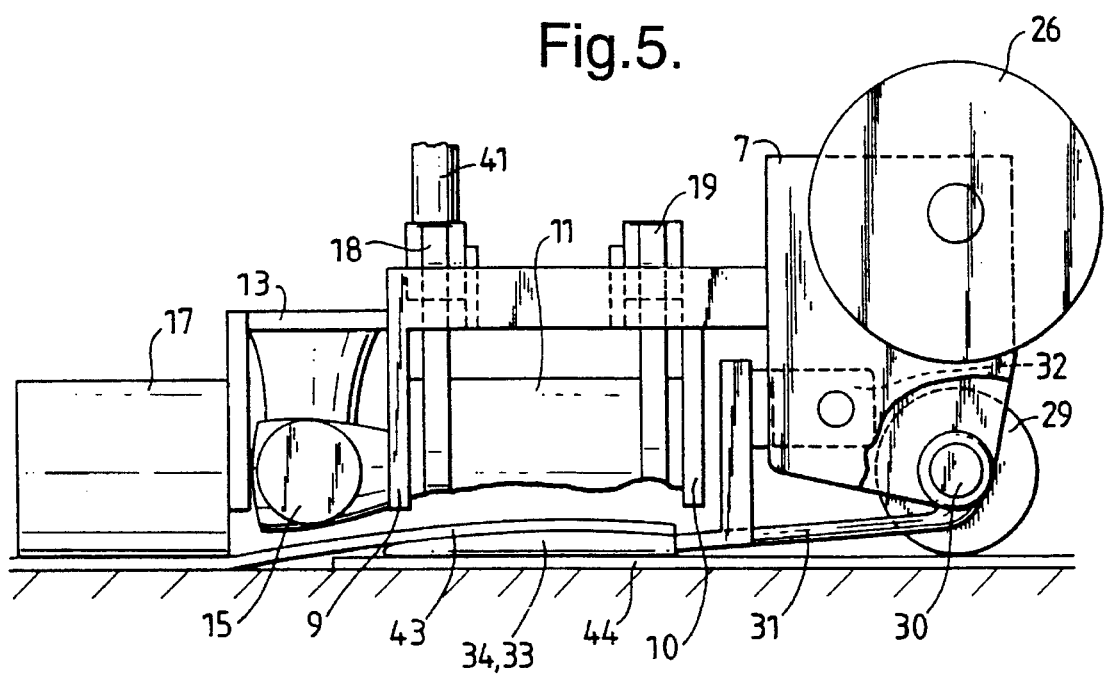
FIG. 5 shows the machine position illustrated in FIG. 2, on a larger scale, with the heating element inserted between an underlying and an overlying length of material, i.e., in a welding position.
Figure 6:
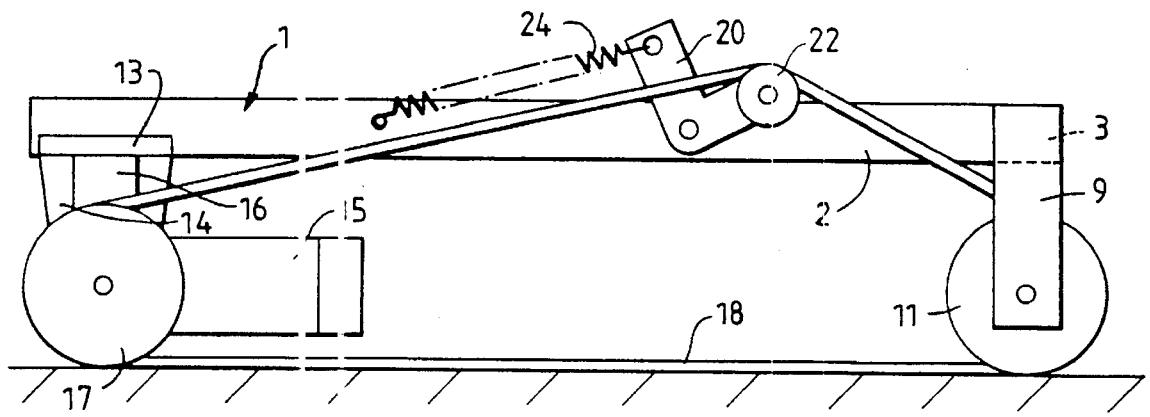
FIG. 6 shows a simplified outline of the machine seen from the left in FIG. 5.
Figure 7:
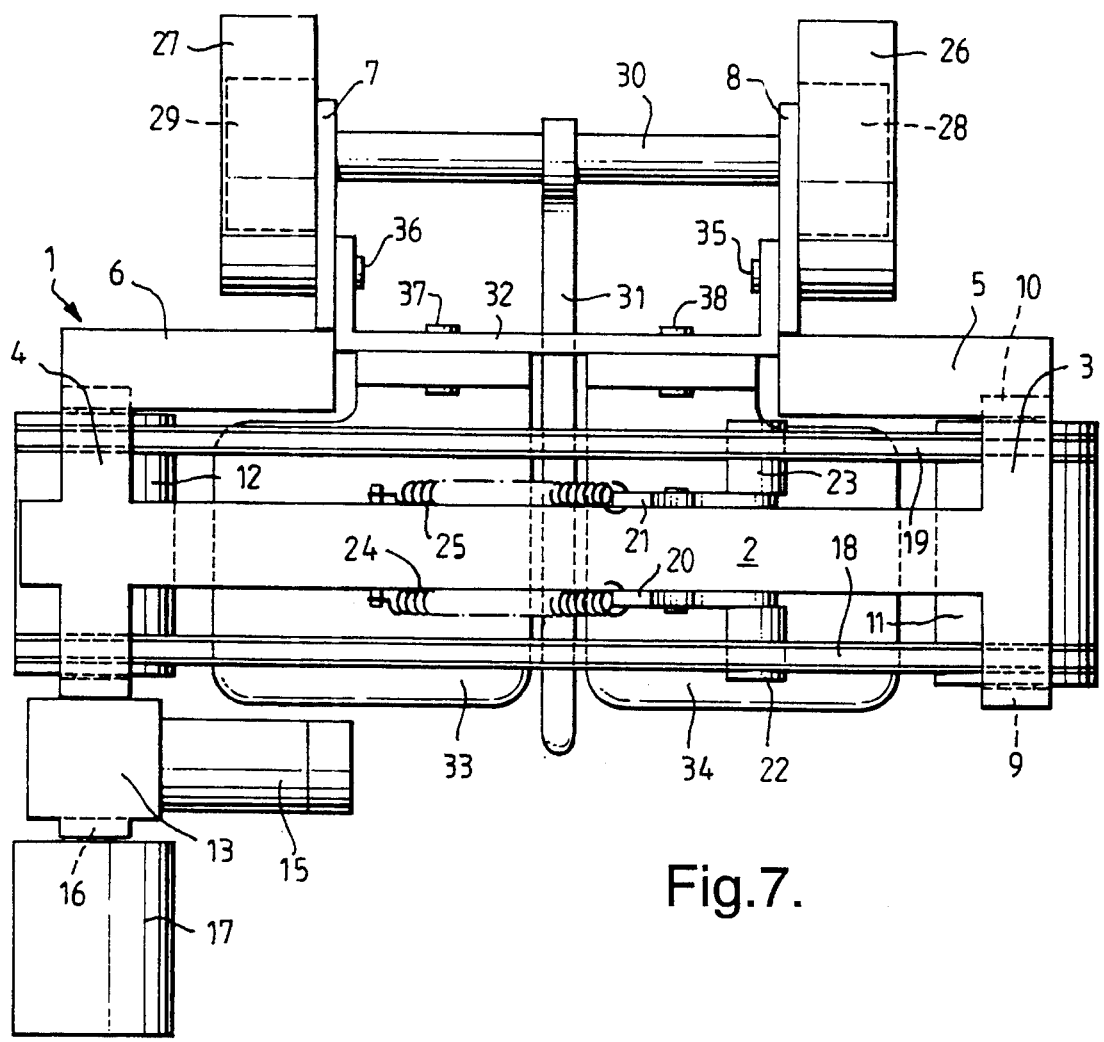
FIG. 7 is a top view of the machine in the position illustrated in FIG. 5.

The machine illustrated in FIGS. 1 to 7 comprises a frame 1 built up as a simple framework, see in particular FIGS. 1, 6 and 7. The framework comprises a square tube 2 having a transverse square tube 3 welded on at one end. A square tube 4 is welded on at the other end of the square tube 2, extending outwards from one of the sides of the square tube 2. As shown in FIG. 7, respectively shorter square tubes 5 and 6 extend from the square tubes 3 and 4, parallel to the long square tube 2. These two shorter square tubes 5 and 6 terminate equidistant from one another, and support on each of their opposing ends a bracket plate 7 and 8 respectively. From this frame structure, there project downwards from the under side of the transverse square tube 3 two flat bar steel pieces 9 and 10, which serve as mounting brackets for a wheel 11. The wheel 11 is constructed as a roller or a cylindrical body. At the other end of the frame structure, welded on in a similar way, are two downwardly projecting flat bar steel pieces which form mounting brackets for a wheel 12, in the same way as for the wheel 11. The wheel 12 is shaped in the same fashion as the wheel 11, i.e., as a cylindrical body.

As is shown in particular in FIGS. 6 and 7, a mounting plate 13 welded into place projects from the square tube 2. This mounting plate 13 supports a gearbox 14 with accompanying driving motor 15, for driving the wheel 12.

A flat bar steel piece 16, welded into place, projects downwards from the mounting plate 13 and forms a mounting bracket for a wheel 17. This wheel 17 is a freely rotating mounted wheel and also has, as shown, a roller or cylindrical form.

Two driving chains 18, 19 are placed around the wheels 11 and 12 in corresponding rotation tracks. Two tension arms 20, 21 are mounted on the square tube 2. Each of these supports a tension roller 22, 23 for a respective driving chain 18, 19. The angular tension arms are actuated by respective tension springs 24, 25, which operate between the respective tension arms and a point of attachment on the square tube 2.

A transport wheel 26 is rotationally mounted in the bracket plate 7. Similarly, a corresponding transport wheel 27 is rotationally mounted in bracket plate 8. A bearing/support wheel 28,29 is also rotationally mounted in the bracket plate 7 and in the bracket plate 8.

A tube 30, welded into place, here in line with the rotational axes of the wheels 28,29, extends between the bracket plates 7 and 8. This tube 30 serves as a brace for the structure and as a support member for the limitedly pivotal mounting of a guiding element 31.

Figure 8:
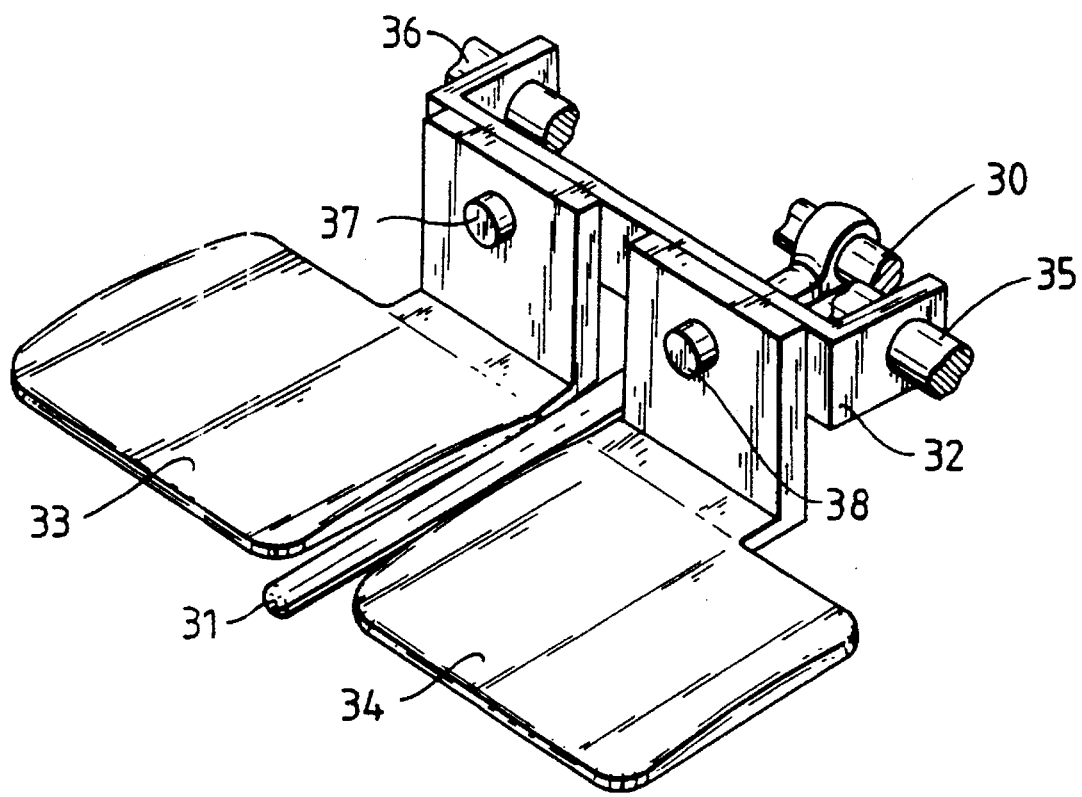
FIG. 8 is a perspective outline of the principal components in connection with the suspension of the heating element.

Furthermore, in the two bracket plates 7 and 8, a U-shaped carrier 32 is rotationally mounted for a heating element, which here consists of two separate heating shoes 33 and 34 respectively. Reference is made in this connection to FIG. 8. The carrier 32 is pivotally mounted in the bracket plates 7 and 8 by means of the indicated pins 35,36, whilst each individual heating shoe 33,34 is limitedly pivotally mounted in the carrier 32, as indicated at 37,38.

The limited pivoting of the guiding member 31, each individual heating shoe 33,34 and the carrier thereof 32, is not shown, since in this case it is a matter of structural details that are obvious to a person versed in the art (for instance, interlocking lugs, projections and similar).

Figure 2:
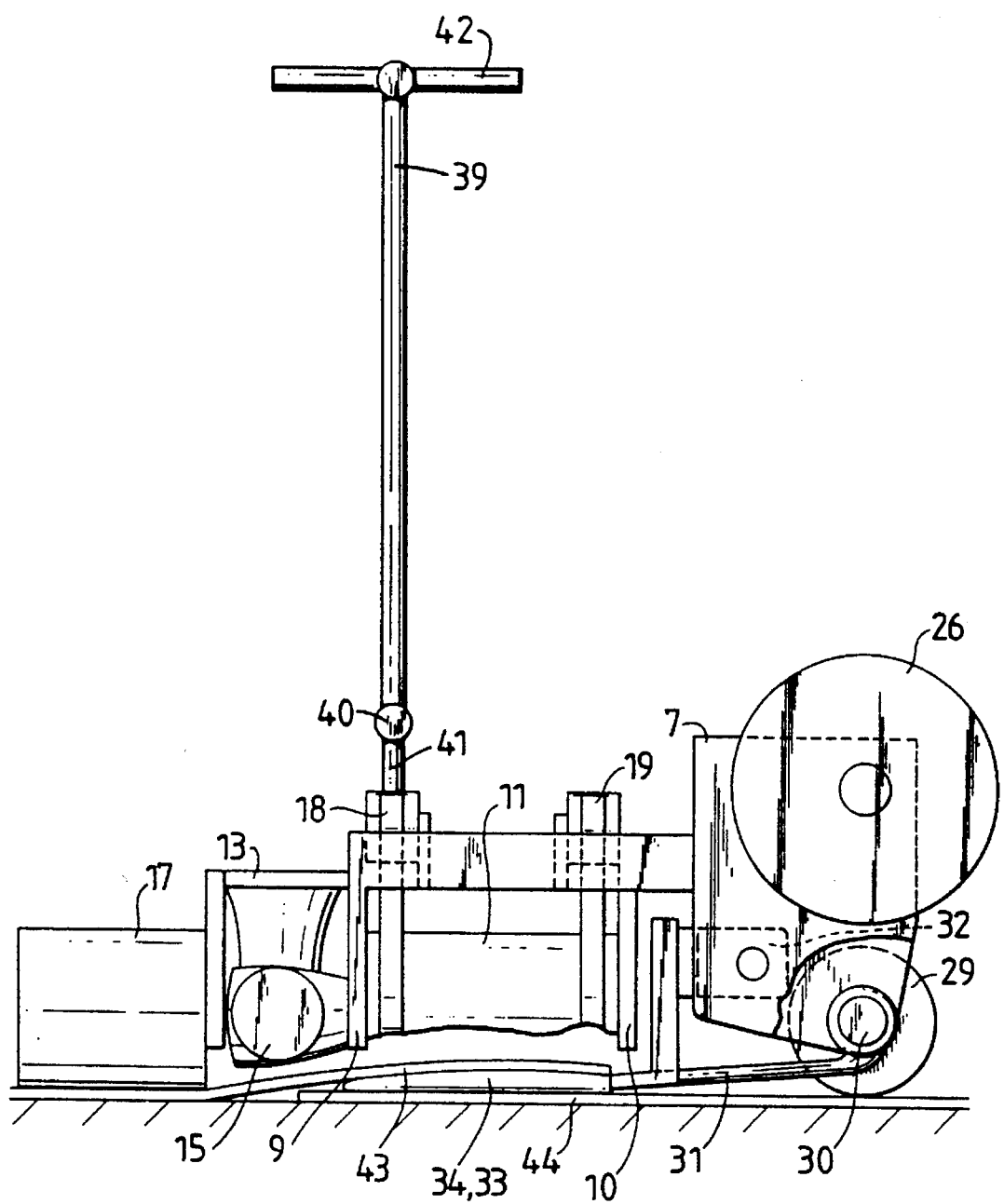
FIG. 2 is an outline of the machine according to the invention in the welding position, in the same outline as in FIG. 1, seen in the welding direction.
Figure 3:
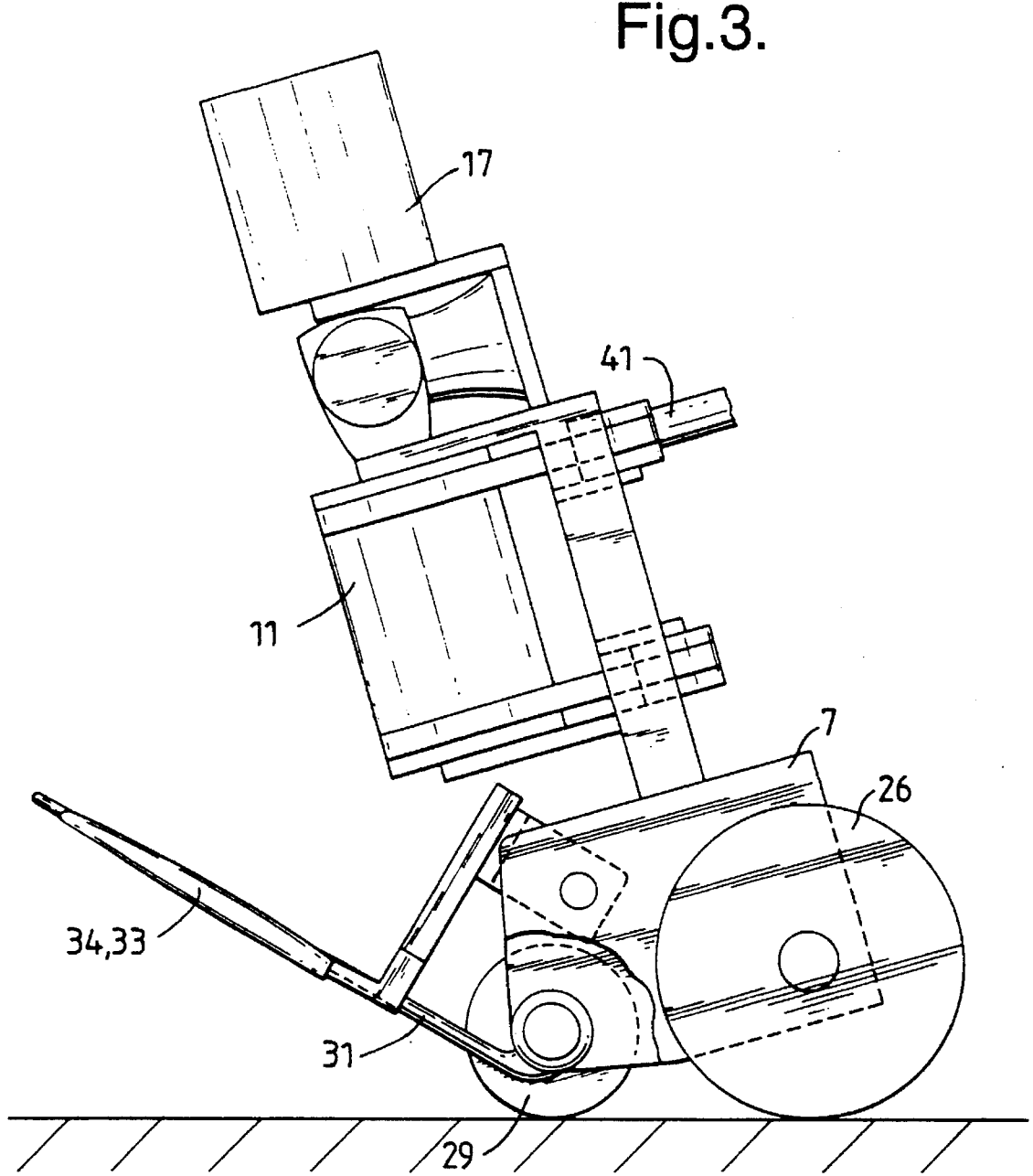
FIG. 3 is an enlarged outline of the machine in the position illustrated in FIG. 1.

The mode of operation of the machine shall now be explained in more detail:

In FIG. 1 and in FIG. 3, the machine is illustrated in its transport position. In this position, the machine rests on the two transport wheels 26,27. The machine can be moved, i.e., it can be wheeled on the underlying surface by means of the illustrated control rod 39, which is connected to the machine by means of an adjustable joint 40, located on a fixing bracket 41 which projects upwardly from the square tube 2 (not illustrated in FIGS. 6 and 7). There is a cross handle 42 on the control rod 39. The joint 40 may be of any appropriate embodiment, and may also be omitted. The purpose is merely to facilitate maneuverability, i.e., any adjustment of the handle 42 and the rod 39, see, e.g., the two positions that are illustrated in FIGS. 1 and 2 respectively. The handle 42 may optionally be rotationally positioned on the end of the rod 39. Operating levers and so forth, not illustrated here, for the driving motor 15 and for the power supply to the heating shoes 33,34, which in this case are heated electrically, are located on the handle 42.

It can be seen from FIG. 1 that in the transport position illustrated here, the wheels 11,12 and 17 project freely upwards, whilst the heating shoes 33,34 and the guiding member 31 hang in their lower limitedly pivotal positions. The heating shoes are, in this lower suspended position, lifted well clear of the underlying surface, so that the heating shoes that might still be hot do not have any effect on the underlying surface.

In FIG. 4, the machine is illustrated in an intermediate position where it is tilted about the support wheels 28,29 so that the heating shoes 33,34 and the guiding member 31 have contact with the underlying surface. The transport wheels 26,27 are now raised from the underlying surface. In this position, the guiding member 31 and the heating shoes 33,34 can be guided in under an overlapping length of covering 43, and thus brought into a welding position between an underlying length of covering 44 and an overlying length of covering 43, as is shown in FIG. 2 and FIG. 5. The member 31 is mounted such that it will enter the gap and lift the overlapping length of covering, and then come down so that the length of covering 43 falls down on the heating element.

As shown in FIG. 4, it is only the leading edge of one heating shoe that has the initial contact with the underlying surface. It is first during the insertion, towards the position that is illustrated in FIG. 5 that the entire under side of the heating shoe finally has surface contact with the underlying surface. This means that a hot heating shoe will not have any particular effect on the underlying surface before the heating shoe has been fully inserted, thereby avoiding heat damage to the covering outside the seam or lap.

In the welding position illustrated in FIGS. 2 and 5, the machine rests on the driving wheels 11,12 and on the wheel 17. This means to say that the weight of the machine now rests on the overlying length of covering. The transmission chains 18 and 19 operate to distribute the weight over the heating shoes, see FIG. 7, and, in this connection, provide compliant driving contact with the length of covering 43. In this position the bearing/support wheels 28,29 are, as shown, easily lifted from the underlying surface.

The seam welding is carried out in that the machine is moved in the longitudinal direction of the lap (vertically on the paper plane in FIG. 5) by means of the driving motor 15, which operates the driving wheel 12 and the transmission chains 18,19 and thus also the wheel 11. After terminated welding, at the end of the lap, the heating element is withdrawn, by using the support that the wheels 28,29 provide, and the machine is tilted up to the position that is illustrated in FIGS. 1 and 3. The machine can then be transported as required, by using the transport wheels 26,27.

Having described our invention, we claim:

1. A machine for seam welding a lap of a weldable length of covering comprising a wheel-borne frame having a heating element suspended on one side, designed for insertion between an underlying and an overlying length of covering, and having pressing means and driving wheels for compressive stress of the upper side of the overlying length of covering in the seam area above the inserted heating element and for movement of the frame in the longitudinal direction of the overlapping seam, characterized in that the frame has transport wheels positioned transverse to the operational direction of the driving wheels and outside the heating element, said transport wheels being lifted clear of the underlying surface, in the welding position.

2. A machine according to claim 1, characterized by bearing/support wheels positioned between the driving wheels of the frame and the transport wheels, having the same operational orientation as said transport wheels.

3. A machine according to claim 1, characterized in that the heating element is limitedly pivotally suspended in the frame about an axis parallel to the operational direction of the driving wheels, with a pivotal sector which comprises the driving plane of the driving wheels.

4. A machine according to claim 3, characterized by a guiding member for the heating element limitedly pivotally mounted about an axis parallel to the pivotal axis of the heating element.

5. A machine according to claim 3, characterized in that the heating element is made in the form of two heating shoes which are limitedly pivotally mounted in a common carrier about parallel axes transverse to the pivotal axis of the heating element.

6. A machine according to claim 5, characterized in that the guiding member is positioned between the two heating shoes.

7. A machine according to claim 1, characterized in that the driving wheels are constituent members in a driving belt-pressing assembly.

8. A machine according to claim 1, characterized in that the driving belt forms a part of the said assembly as a pressing means.

9. A machine according to claim 8, characterized in that the driving belt is formed by two parallel transmission chains.

* * * * *